United States Patent
Lehmann et al.

(10) Patent No.: US 6,848,565 B2
(45) Date of Patent: Feb. 1, 2005

(54) DEVICE FOR CONTAINER ALIGNMENT

(75) Inventors: Rainer Lehmann, Nottuln (DE); Heinz Eckholt, Senden-Ottmarsbocholt (DE)

(73) Assignee: Langguth GmbH, Senden-Bosensell (DE)

( * ) Notice: Subject to any disclaimer, the term of this patent is extended or adjusted under 35 U.S.C. 154(b) by 0 days.

(21) Appl. No.: 10/475,241

(22) PCT Filed: Sep. 14, 2002

(86) PCT No.: PCT/DE02/03450
§ 371 (c)(1),
(2), (4) Date: Oct. 17, 2003

(87) PCT Pub. No.: WO03/048011
PCT Pub. Date: Jun. 12, 2003

(65) Prior Publication Data
US 2004/0129532 A1 Jul. 8, 2004

(30) Foreign Application Priority Data
Nov. 30, 2001 (DE) .......................................... 101 58 832

(51) Int. Cl.$^7$ ............................................. B65G 47/24
(52) U.S. Cl. ................... 198/416; 198/456; 198/457.07
(58) Field of Search .......................... 198/456, 457.07, 198/399, 379, 345.1, 416

(56) References Cited

U.S. PATENT DOCUMENTS

| 2,245,694 A | | 6/1941 | Lindholm .................... 198/429 |
| 3,225,890 A | | 12/1965 | Weise .......................... 198/456 |
| 4,465,175 A | * | 8/1984 | Caldwell ..................... 198/399 |
| 4,741,429 A | * | 5/1988 | Hattori et al. .............. 198/456 |
| 4,930,615 A | * | 6/1990 | Nash ........................... 198/416 |

FOREIGN PATENT DOCUMENTS

WO    WO 98/25841    6/1998

* cited by examiner

Primary Examiner—James R. Bidwell
(74) Attorney, Agent, or Firm—Merchant & Gould P.C.

(57) ABSTRACT

The invention relates to a device for container alignment, comprising a transport device (1), for the containers (6), with pivoting arm pairs (2, 3) with pivoting arms (2a, 2b, 3a, 3b), arranged on each side of the transport path, the pivoting arm pairs (2, 3) being arranged in an opposing manner. The pivoting arm pairs (2, 3) may be synchronously driven and the pivoting arms (2a, 2b, 3a, 3b) each have the pivoting axis (4, 5, 6, 7) at one end thereof and the free other end can swing out essentially into the middle of the transport device.

5 Claims, 5 Drawing Sheets

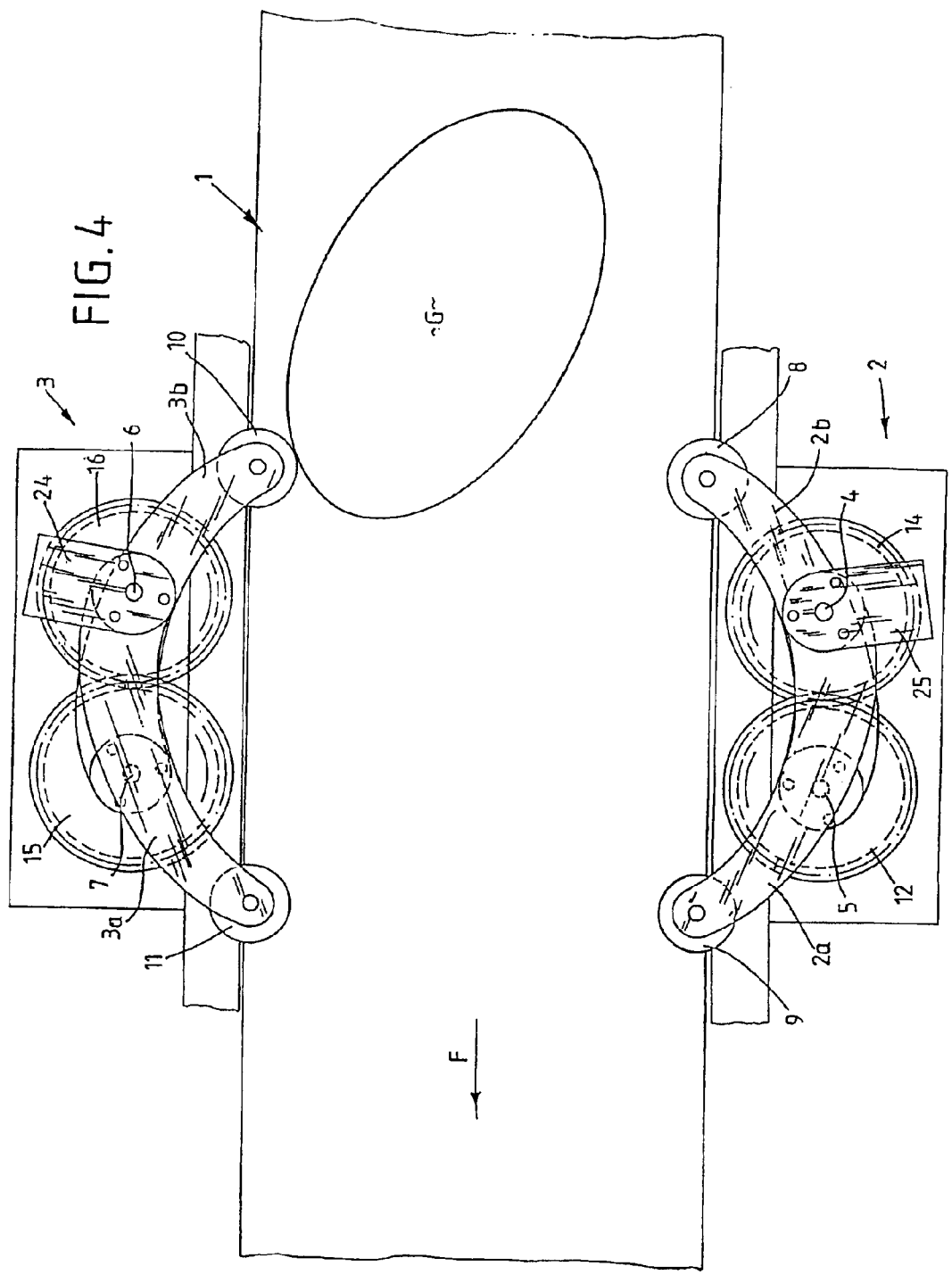

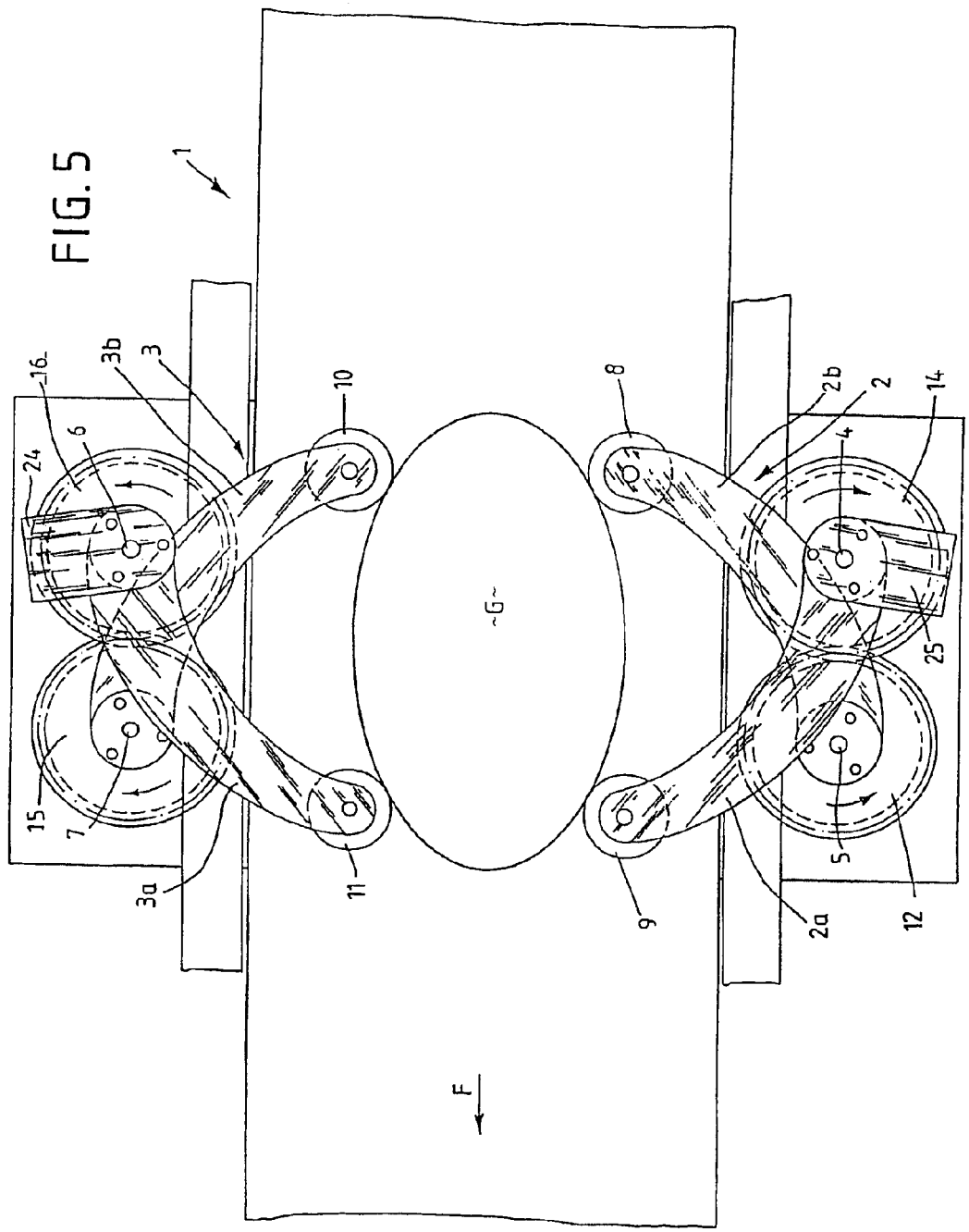

DEVICE FOR CONTAINER ALIGNMENT

Figure 1:
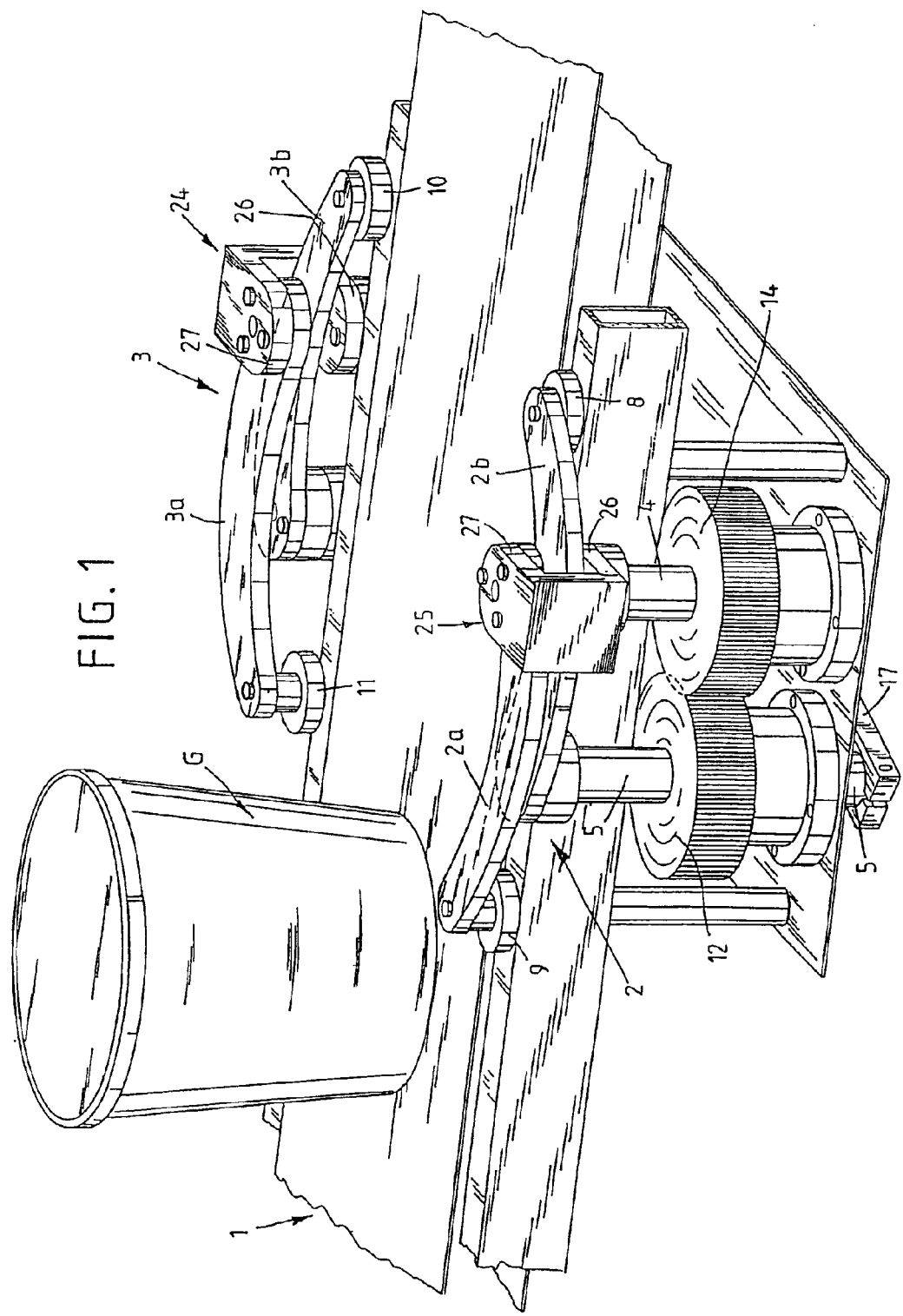

The invention relates to a device for container alignment having a transport device that conveys the containers.

Containers, such as, for example, plastic buckets that have an oval, round, or polygonal shape, after the filling process are delivered to a so-called lid station by means of a transport device, at which station the lid is to be placed onto the filled container.

The lids are fed from a corresponding feed device in which the lids always have the same position, while the containers are not always precisely aligned on the transport device, so that it is necessary to position the containers such that, at least in the lid station, they are arranged in a manner that permits a problem-free mechanical placing of the lid.

The same problems arise in the case of a transport device for a labeling machine. Here likewise the container must be exactly positioned in order to apply the label properly and to prevent a shifting of the label.

Likewise, in the case of palletizing machines in which containers are stacked onto pallets, the containers must be fed to the gripper in an aligned manner, in order to allow a proper placing of the containers onto the pallets and thus a space-efficient storing of the containers on the pallets.

Described in U.S. Pat. No. 3,225,890 A is a device by means of which the size of the article transported on a conveyor belt is determined and, at the same time, this article can be shifted such that it is situated with its center point on the axis of the transport device conveying the device. For this purpose, provided on either side of the transport device are pivoting arms that are driven independently of each other. The first pair of pivoting arms, which face each other, has the task of determining the size of the article situated on the transport device, and task of the second pair of pivoting arms, which follows the first pair of pivoting arms in the transport direction, is now, depending on this determined size, to shift the article on the transport device so that it is centrally positioned.

By means of such a device, the centered position of the conveyed device on the transport device can be set. However, using such a device an alignment of the axis of the article with the axis of the transport device cannot be achieved in the case of a transported article having an oval or polygonal form.

The invention is based on the task of creating an auxiliary device by means of which the containers or other vessels are aligned on the transport device such that they can be fed to the subsequent processing station, e.g. a lid station, or to a pallet in a precisely aligned manner.

This task forming the basis of the invention is accomplished through the teaching of the main claim.

Advantageous developments of the invention are elucidated in the dependent claims.

Expressed in different terms, it is proposed that the pivoting arm pairs, arranged facing each other on either side of the transport path, be arranged one atop the other and so as to penetrate U-brackets, one shank of which is connected to the pivoting axis and the other shank of which carries the pivoting arm associated with this pivoting axis. Further, the pivoting arm pairs are synchronously driven and formed such that the free ends of each pivoting arm can swing out substantially into the middle of the transport device.

All four pivoting arms swing simultaneously by the same angular measurement into the region of the transport path, grasp the arriving container, and push the latter into the middle of the transport path and into a correctly aligned position such that, for example in the case of an oval container, the long axis of the oval is aligned in the conveying direction of the transport device.

In order to avoid disturbing the transport movement of the container, freely-rotating rollers can be arranged on the pivoting arm ends acting in the conveying direction of the transport device, or glide bumpers can be provided here that can act upon the container with pressure but do not hinder the transport movement of the container.

The pivoting movement of the pivoting arm pairs is controlled, for example, through a photocell, to the effect that upon arrival of the container at a certain position in the action region of the pivoting arms the latter are driven, and at a certain position of the now-aligned container the pivoting arms swung back again and thus release the transport movement of the container.

Although four pivoting arms are provided, only two pivoting axes are driven and, via meshing gears arranged on the driven pivoting axis and the non-driven pivoting axis, the non-driven pivoting axis is actively connected in an indirect manner to the driven pivoting axis.

With respect to the drive system for this apparatus, it is proposed that connecting rods be attached to each motor-driven pivoting axis, which connecting rods are attached to arms of a pivoting T-element, to whose crosspiece the drive is connected; preferably an electric motor serves as the drive, but any other means of propulsion can also be used.

In the following, an embodiment example of the invention is explained with the aid of the drawings. These show: (remainder corresponds to the original documentation starting on page 4)

FIG. 1: a diagrammatic view of the device according to the invention

Figure 2:
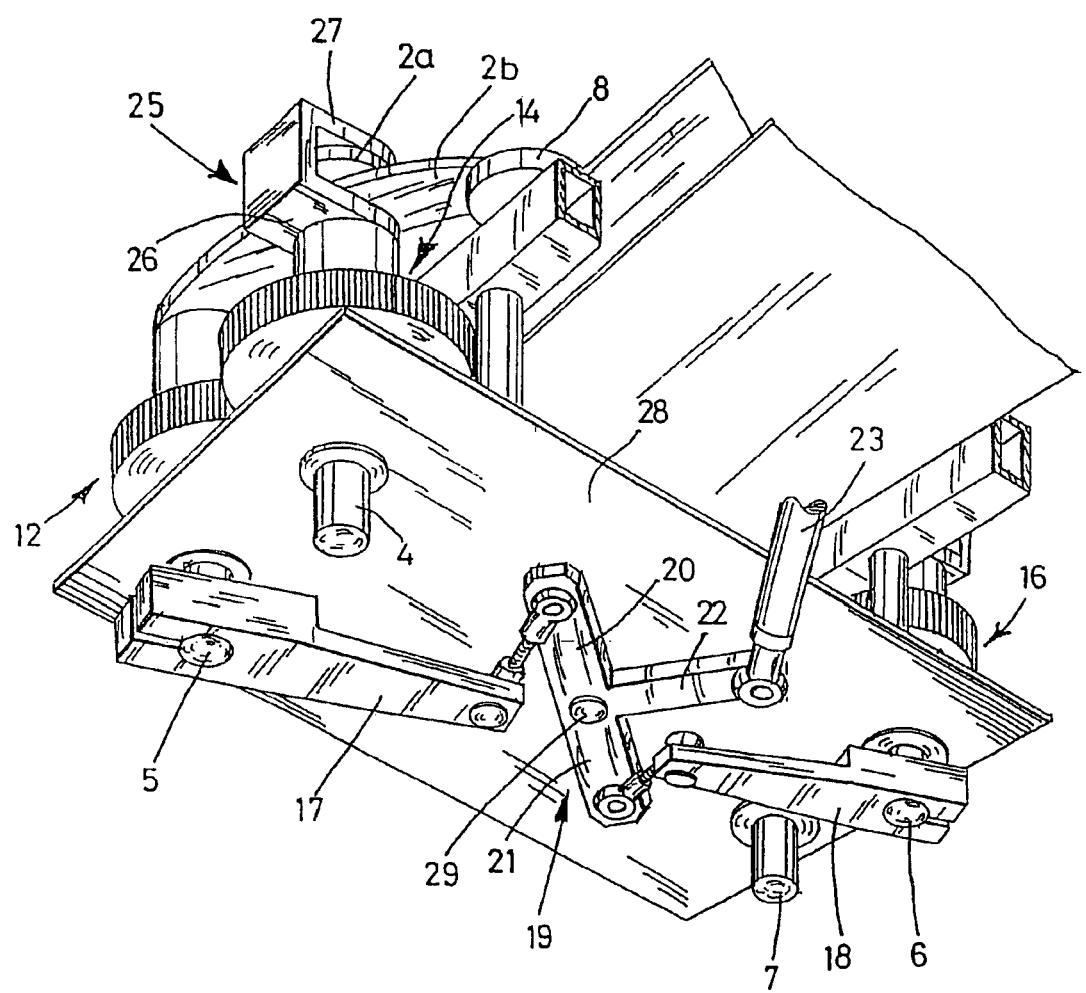

FIG. 2: a view from below of the control device driving the pivoting arms

Figure 3:
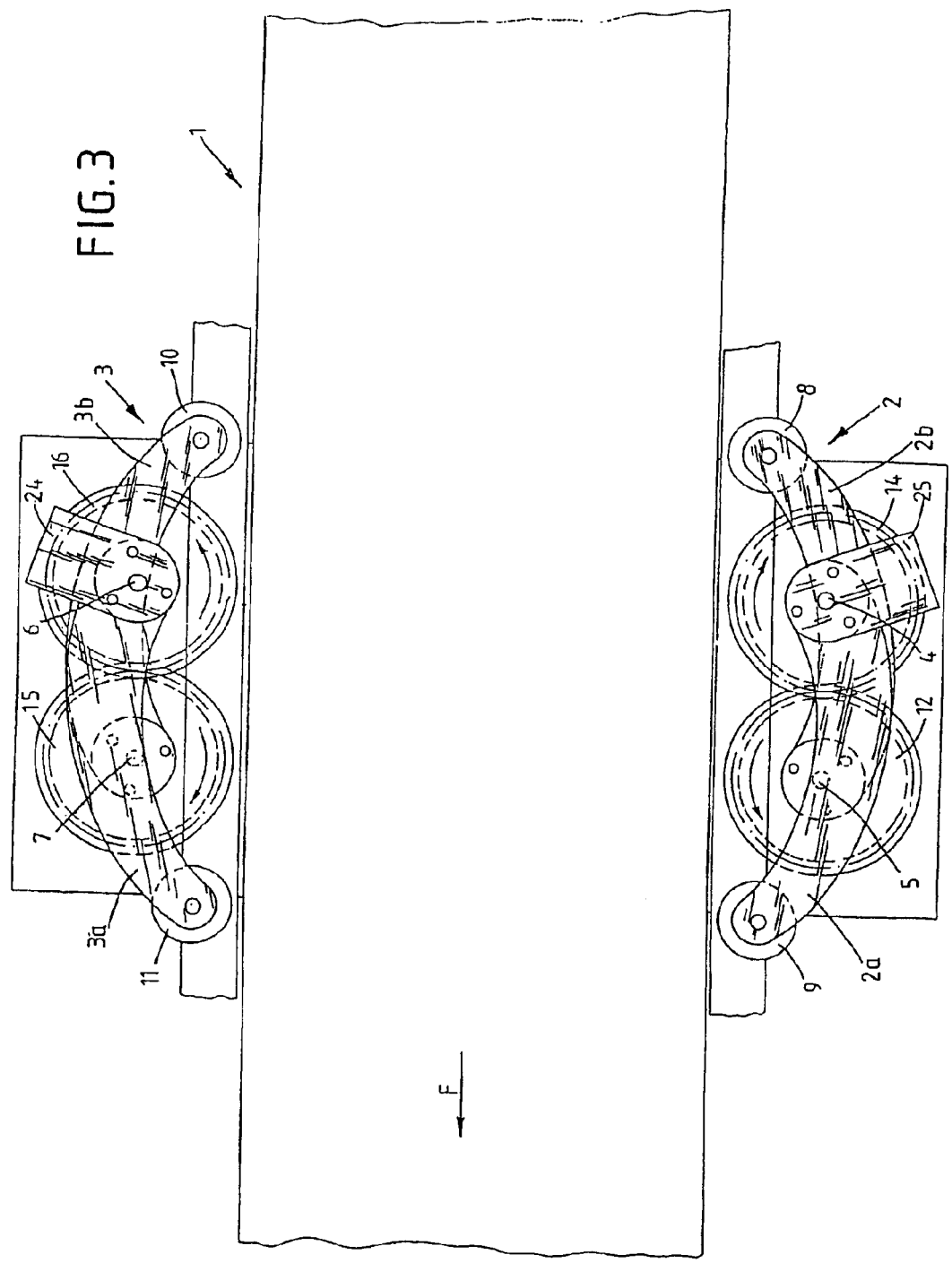

FIG. 3: in a plan view, an arrangement according to the invention without container FIG. 4: a plan view according to FIG. 3, with a container not yet aligned FIG. 5: an arrangement according to FIG. 4 in which the container is now aligned, but the pivoting arms have not yet been retracted Represented in FIG. 1 is a transport device 1 that, for the sake of clarity, is represented in the embodiment example as a conveyor belt; here, obviously, application can also be made of a roller conveyor that facilitates a shifting of the container G arranged on the conveyor device 1.

Arranged on both side of this conveyor device are pivoting arm pairs 2, 3; the pivoting arm pair 2 displays two pivoting arms 2a and 2b, and the pivoting arm pair 3 displays pivoting arms 3a and 3b.

The pivoting arms are connected to pivoting axes 4, 5 or 6, 7, respectively (FIG. 2), and at their free ends carry freely rotating rollers 8, 9 or 10, 11, respectively.

From FIG. 3 it can be recognized that the pivoting arm 3a is connected to the pivoting axis 6 via a bracket 24 and the pivoting arm 3b is arranged directly upon the pivoting axis 7. Likewise, the pivoting arm 2a is connected to a bracket 25 and the pivoting arm 2b directly to the pivoting axis 5, with the pivoting axes 4 and 5 being in contact via meshing gears 12, 14, while the pivoting axes 6, 7 are in contact with each other via meshing gears 15 and 16.

From FIG. 1 it can be recognized that each bracket 25 and 26 is designed as a U-bracket and displays an upper shank 27 and a lower shank 26, with the upper shank 27 carrying the pivoting arm 2a or 2b associated with this bracket, while the lower bracket is connected to the associated pivoting axis 4 or 6. Thus, through actuation of this pivoting axis, both the bracket and the associated arm are pivoted.

The pivoting arms 2a and 2b or 3a and 3b, as the case may be, are arranged one upon the other and the pivoting arm 3b or 2b not carried by the bracket 24 or 25 penetrates this U-shaped bracket.

FIG. 2 shows a preferred embodiment form of the drive for the pivoting arm, seen from below.

On the underside of a carrier plate 28, supported so as to pivot around an axis 29 is a T-element 19, attached to whose two arms 20 and 21 are connecting rods 17 and 18, which at the other end are connected to the driven pivoting axes 5 and 6. A crosspiece 22 of the T-element 19 bears a drive rod 23 to which a drive motor (not represented in the drawing) is actively connected.

The pivoting axes 4 and 7, which are only indirectly driven, are visible in the drawing and are driven via the meshing gears, for example 12 and 14 or 15 and 16.

In this representation in FIG. 2 it can be recognized that upon actuation of the drive rod 23 a pivoting movement of the T-element 19 occurs and, through this, a pivoting of the connecting rods 17 and 18, thus causing a rotational movement of the directly driven pivoting axes 5 and 6.

Further evident from this illustration is the fact that the driving of the pivoting arms takes place in a completely synchronous manner, i.e. all four pivoting arms 2a and 2b, 3a and 3b make an equal motion either towards the middle of the transport device 1 or backwards away from the middle.

FIG. 4 shows a container G that is fed by the transport device 1 to the device according to invention in an "unaligned" state. As a result of a control signal, for example via a light source or another sensor apparatus, the drive rod 23 is now actuated and, through this, the pivoting arm pairs 2 and 3 swing from their rest position into the path of the transport device 1, and, in the embodiment form shown in FIG. 4, it is evident that the roller 10 first comes into contact with the container G and then pushes the front side of the container G into the middle of the transport device 1. Simultaneously, the container G is further transported in the direction of the arrow F, and at some point the roller 8 also comes into contact with the container G and then pushes the container G further into the correct position.

FIG. 5 shows how the container, completely aligned and in contact with all of the rollers 8, 9 and 10, 11, stands at the middle of the transport device 1. Immediately after this point the pivoting arms 2a, 2b and 3a, 3b retract and the container G can be conveyed to the subsequent processing station, for example a lid station or the like.

What is claimed is:

1. Device for container alignment having a transport device that conveys containers, wherein the transport device comprises at least a first and a second pivoting arm pair wherein each pair comprises at least a first and a second pivoting arm, said pivoting arm pairs are arranged facing one another on either side of a transport path, wherein the first and the second pivoting arms of each pivoting arm pair are arranged one atop the other, wherein the first and second pivoting arms have at least a first and a second pivoting axis, respectively, and wherein said first pivoting arm penetrates a U-bracket, of which a lower shank is connected with the first pivoting axis and of which an upper shank carries the first pivoting arm associated with the first pivoting axis, wherein the first and second pivoting arm pairs being synchronously drivable and the first and second pivoting arms, corresponding to each pivoting arm pair, have at one end the corresponding first or second pivoting axis, the other, free end being swingable out into substantially the middle of the transport device.

2. Device as claimed in claim 1, wherein the first and second pivoting axes of each pivoting arm pair carry at least a first and a second meshing gear.

3. Device as claimed in claim 1, wherein the first or second pivoting axis is driven.

4. Device as claimed in claim 3, wherein a connecting rod is attached to the driven pivoting axis, which a connecting rod is attached to an arm of a T-element mounted in a pivoting manner, a crosspiece of which is connected to a drive.

5. Device as claimed in claim 1, wherein the pivoting arms of each pivoting arm pair are arranged one upon the other and penetrate U-brackets, the lower shank of which is connected to the first pivoting axis and the upper shank of which carries the first pivoting arm associated with the first pivoting axis.

* * * * *